United States Patent
Birnbaum et al.

(10) Patent No.: US 10,411,829 B2
(45) Date of Patent: Sep. 10, 2019

(54) APPARATUS FOR FREE-SPACE OPTICAL COMMUNICATIONS AT HIGH DATA RATES

(71) Applicant: Facebook, Inc., Menlo Park, CA (US)

(72) Inventors: Kevin Michael Birnbaum, Reseda, CA (US); Kevin Jerome Quirk, Los Altos, CA (US); Hamid Hemmati, Encino, CA (US); Chien-Chung Chen, Sunnyvale, CA (US); Gary Mak, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 30 days.

(21) Appl. No.: 14/828,322

(22) Filed: Aug. 17, 2015

(65) Prior Publication Data

US 2017/0054527 A1    Feb. 23, 2017

(51) Int. Cl.
*H04L 1/00* (2006.01)
*H04B 10/60* (2013.01)
(Continued)

(52) U.S. Cl.
CPC .......... *H04L 1/0041* (2013.01); *H04B 10/112* (2013.01); *H04L 1/0045* (2013.01); *H04L 1/02* (2013.01); *H04L 2001/0096* (2013.01)

(58) Field of Classification Search
CPC ..... H04L 1/004; H04L 1/0041; H04L 1/0042; H04L 1/0045; H04L 1/0076; H04L 1/0077; H04L 1/02; H04L 1/06; H04L 1/0606; H04L 1/0618; H04L 1/0625; H04L 1/0631; H04L 1/0637; H04L 1/0643; H04L 2001/0096; H03M 13/05; H03M 13/13; H03M 13/154; H03M 13/2792; H03M 13/6306; H04B 10/516; H04B 10/60; H04B 10/112
See application file for complete search history.

(56) References Cited

U.S. PATENT DOCUMENTS

| | | | |
|---|---|---|---|
| 8,276,035 B1 * | 9/2012 | Savarese | H04L 1/0007 714/749 |
| 2002/0075542 A1 * | 6/2002 | Kumar | H04L 12/6402 398/98 |

(Continued)

OTHER PUBLICATIONS

"Forward error correction for high bit-rate DWDM submarine systems", Int'l. Telecomm. Union-Telecomm. Standardization Sector (ITU-T), Reg. G.975.1, in Series G: Transmission Systems and Media, Digital Systems and Networks: Digital sections and digital line system—Optical fibre submarine cable systems, Feb. 22, 2004, 1-58.

*Primary Examiner* — Kyle Vallecillo
(74) *Attorney, Agent, or Firm* — FisherBroyles, LLP

(57) ABSTRACT

Systems and methods for optical communication through air or space are disclosed. A method includes encoding one or more data frames with a data-link layer forward error correction (FEC) code to produce a plurality of encoded data frames and transmitting the plurality of encoded data frames from a transmitter (TX) to a receiver (RX) at least partially through air or space using a plurality of optical beams. The RX identifies a corrupted encoded data frame and reconstructs the corrupted encoded data frame using a data-link layer FEC decoder operating over a plurality of non-corrupted encoded data frames.

20 Claims, 7 Drawing Sheets

(51) Int. Cl.
*H03M 13/15* (2006.01)
*H04B 10/516* (2013.01)
*H03M 13/27* (2006.01)
*H03M 13/13* (2006.01)
*H04L 1/02* (2006.01)
*H04B 10/112* (2013.01)

(56) References Cited

U.S. PATENT DOCUMENTS

| | | | | |
|---|---|---|---|---|
| 2006/0050803 | A1* | 3/2006 | Barnes | H04J 14/0221 375/261 |
| 2013/0132789 | A1* | 5/2013 | Watford | H04L 1/0041 714/752 |
| 2013/0216221 | A1* | 8/2013 | Zhang | H04L 1/0057 398/43 |
| 2013/0315211 | A1* | 11/2013 | Balan | H04B 7/0697 370/336 |
| 2014/0331111 | A1* | 11/2014 | Kroeger | G06F 11/1004 714/807 |
| 2014/0365694 | A1* | 12/2014 | Bolton | H04W 80/02 710/106 |
| 2015/0071312 | A1* | 3/2015 | Batshon | H04B 10/2575 370/542 |
| 2015/0124721 | A1* | 5/2015 | Lamy-Bergot | H04L 1/0071 370/329 |
| 2015/0162986 | A1* | 6/2015 | Campos | H04B 10/27 398/70 |
| 2016/0191203 | A1* | 6/2016 | Mitchell | H04L 1/0041 714/776 |
| 2016/0204866 | A1* | 7/2016 | Boroson | H04B 10/1121 398/97 |

* cited by examiner

APPARATUS FOR FREE-SPACE OPTICAL COMMUNICATIONS AT HIGH DATA RATES

TECHNICAL FIELD

The present technology is directed generally to high data rate, e.g., 100's of gigabits-per-second (Gbps), optical (laser) communication through air and/or vacuum. Specifically, recovery of lost data frames is improved by applying data correction at the data-link layer over multiple spatially separated optical beams corresponding to channels at the physical layer.

BACKGROUND

Wireless communication systems transfer data from a transmitter (TX) of one station to a receiver (RX) of another station. The TX and RX can be ground-based, airborne or spaceborne. Furthermore, multiple stations (TX or RX) can be ground-based and in communication with one or more air or space platforms (RX or TX). These ground/airborne/spaceborne telecommunication systems have to support uplink and downlink of large and ever-increasing volumes of data (e.g., Internet data).

To address higher capacity and higher performance needs, the fiberoptics industry developed coherent fiber optic transceiver technologies using digital signal processors (DSPs) for the next generation of high-rate communications. DSP-based coherent transceivers offer the advantage of an intrinsic 4 to 5 dB signal-to-noise ratio (SNR) improvement over intensity modulated direct detection (IMDD) systems using optical preamplification, along with implementation factors that, in practice, increase performance by another 5 to 6 dB. These transceivers also offer higher spectral efficiency and lower power consumption. Moreover, the integrated photonics technology employed in coherent transceivers provides a competitive $/bit/s cost-benefit value, e.g., as can be measured in dollars per bit per second.

Errors in recovering wirelessly transmitted data may be due to many causes, including but not exclusive to noise sources in the receiver and distortion of the signal in the transmission medium. The plurality of causes, referred to as channel impairments, are typically mitigated by a combination of techniques including channel equalization and forward error correction (FEC) coding at the physical layer. Channel equalization is used to reduce the amount of inter-symbol interference induced by band-limiting in the receiver or channel to produce better estimates of the received symbols. Physical layer forward error correction (FEC) coding introduces a structured redundancy on the transmitted symbol sequence that can be exploited at the receiver to correct errors in recovering the transmitted data due to channel impairments.

In free-space optical communications systems that propagate light through air, a significant source of channel impairment is turbulence. Turbulence causes frequency nonselective fades in optical power. The fade process has a correlation time which is typically much longer than the duration of a symbol.

To reliably communicate in the presence of a frequency nonselective slowly fading channel, temporal diversity techniques can be used. In this technique, multiple observations of the transmitted data are made across distinct channel coherence times can be used. This can be accomplished with groups of physical layer FEC encoded symbols (referred to herein as "codewords") that span multiple channel coherence times, codewords that are interleaved to span multiple channel coherence times, or automatic-repeat request (ARQ) schemes that, upon receiving a block of data in error, request a re-transmission of that data. The encoding and decoding complexity of a physical layer FEC code increases with the length of the codeword, and for high data rate systems it can be prohibitively complex to have a codeword span multiple channel coherence times. Channel interleaving techniques interleaves the symbols from multiple codewords to extend the support of each across the length of the interleaver. This method (in the limit of long interleaver length) achieves the channel capacity; however, depending on the type of interleaver and physical layer FEC code, this method can incur a fixed latency penalty that is undesirable or exceeds the system requirements. An ARQ scheme adapts with the channel conditions and therefore does not incur a fixed latency penalty; however, the additional round-trip latency from the re-transmission requests and the need for an additional feedback channel make these ARQ schemes impractical or undesirable in many cases.

Another conventional approach to mitigate fading relies on spatial diversity. Turbulence has a transverse correlation length r0. If two optical source beams are separated by a distance D, then their fades will become independent when D>>r0. Turbulence also causes optical phase to be randomized, with similar correlation times and distances. A conventional technology that utilizes spatial diversity to mitigate turbulence is called multi-beaming. The multi-beaming technique works by sending the same symbol along different paths separated by D, where D>>r0 such that different paths experience statistically independent fades and phase offsets. When the various signals are highly non-coherent to each other, the intensity average over a symbol period is equal to the sum of individual path signal intensities. In this case, the total received signal intensity is the sum of several independent fading processes and will thus have reduced fade frequency and fade depth. This approach is suitable when information is encoded only in intensity, but is not applicable when the optical phase carries information. Accordingly, there remains a need for optical communication systems that can reliably transfer data through the atmosphere with high data throughput and low latency of the data transmission.

DETAILED DESCRIPTION

Figure 1A:
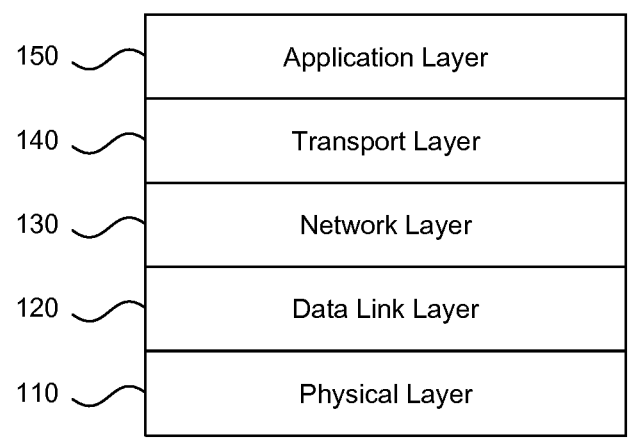
FIG. 1A is a schematic illustration of different layers in data transmission.

Specific details of several embodiments of representative optical data communication systems and methods are described below. The inventive technology is directed to communications links between ground station(s) and airborne or spaceborne platforms at data-rates that have not been possible before and with mass/power/size that is significantly lower than transceivers that use conventional technology.

Briefly described, the inventive technology uses multiple optical beams to communicate data through the atmosphere or through the atmosphere and vacuum. The data communicated may be communicated between two ground stations, between a ground station and an airborne platform, between a ground station and a spaceborne platform, between two airborne or two spaceborne platforms, between an airborne platform and a spaceborne platform, or any suitable combination thereof. Additionally, any of the stations or platforms in any of the configurations described herein may operate as transmitters, receivers, or transceivers. The individual optical beams (which may correspond to individual channels) can carry independent data to establish multiple independent links from a transmitter (TX) to a receiver (RX), therefore increasing the throughput of the system. The individual optical beams can operate on different wavelengths. The beams may be produced by optical sources such as lasers or light emitting diodes. In at least some embodiments, the inventive technology uses advanced modulation formats and coherent detection (e.g. dual-polarization quadrature-phase-shift keying (DP-QPSK), binary PSK (BPSK), or Quadrature Amplitude Modulation (QAM)) in conjunction with multiple optical beams, which were previously thought to be incompatible). In other embodiments, the inventive technology uses direct detection (e.g., intensity modulated direct detection). Any suitable modulation format or technique may be employed.

Some embodiments of the inventive technology use coherent optical communication. In coherent optical communications systems, information to be conveyed across a link is modulated onto the amplitude and phase of a transmitted optical carrier signal as a sequence of symbols chosen from a fixed alphabet of amplitude and phase pairs according to the data to be conveyed. As information is now encoded in the phase of the received optical signal, it cannot be directly recovered, as in a direct detection scheme, by a photo-detector, which measures intensity. To recover the phase of the received signal, there are several different types of demodulator structures that can be used. These demodulators can be variants on the method of mixing the received optical signal with a local reference signal, which results in the intensity of the mixed signal being a function of the difference between the received signal phase and the local reference. This can then be measured by a photo-detector and processed to estimate the transmitted symbol and corresponding transmitted data sequence.

The inventive technology uses multiple beams separated spatially by a distance D, where $D \gg r_0$, where $r_0$ is a radius of a beam of light, and is compatible with coherent communications. We use multiple transmitters that are spatially separated. In some embodiments, each transmitter sends light that can be separated from the light sent by the other transmitters. In some embodiments, this separability is implemented by having each transmitter use a distinct optical carrier frequency, such that the spectrum used by each transmitter is generally distinct and non-overlapping. Each transmitter can have adequate spatial separation from the others, such that the fading process is statistically independent on each transmitter.

In some embodiments of the inventive technology, each transmitter-to-receiver link can implement an independent physical layer FEC code and channel interleaver that are designed to target channel impairments whose coherence time is much less than that of the frequency non-selective fading. Under some scenarios, this may result in blocks of codewords that are not recoverable by the physical layer FEC when the signal level drops below the receiver sensitivity threshold (due to channel fading). To correct for these errors, data-link layer FEC is introduced. The data-link layer FEC encoder operates across the individual channels, and may have support across multiple channel coherence times. In the event that the physical layer FEC and data-link layer FEC codes were unable to recover the transmitted information, a transport layer protocol, such as TCP, can utilize an ARQ scheme as necessary to retransmit lost data frames.

Prior to sending the data through the atmosphere, one or more data frames are encoded with a data-link layer FEC code. In particular embodiments, the data-link layer FEC code is an erasure code. In some embodiments, the erasure code used can be a fountain code. In some embodiments, each data-link layer FEC encoded data frame (referred to herein as "encoded data frame") may then be sent to one of multiple channels (described in further detail below). Within a channel, the symbols of the encoded data frames are encoded with a physical layer FEC code that can be exploited at the receiver to correct for errors due to a number of effects including channel fading. At the physical layer, the use of codeword interleaving at the transmitter and corresponding codeword de-interleaving at the receiver will spread a burst of errors across multiple codewords for correction by the decoder. The interleaved codewords of a particular channel are then modulated onto light of a designated wavelength for that channel (which may be different for each of the multiple channels) and then transmitted through free space. At the RX, the light is collected by the receive aperture or apertures. The received signal may then pass through a demultiplexer to produce data from individual optical beams (e.g., from the individual channels). The data in each individual channel can then be demodulated, de-interleaved to reconstitute the codewords, and then decoded to reconstitute the encoded data frames. Finally, one or more reconstituted encoded data frames are passed through the data-link layer FEC decoder to produce the reconstituted data frames. Therefore, at the RX, a particular data frame can be: (i) received fully (e.g., no errors in the data frame); (ii) recovered using the error correction for that channel; or (iii) be non-recoverable using the error correction for that channel (e.g., the data frame includes too many errors rendering it unrecoverable). Instead of declaring as lost the non-recoverable data frame and retransmitting it, the inventive technology applies additional data frame recovery across one or multiple channels to improve the overall frame recovery. For example, data-link layer FEC in the form of an erasure code (e.g., a "fountain code") can be implemented over multiple data frames prior to transmitting data frames from the TX to the RX over individual channels. If the recovery within the channel fails, the data-link layer FEC erasure code applied over multiple channels and data frames may be used in many cases to recover the erased data frame without retransmitting the data frame and without the concomitant increase in the latency of data transmission.

FIG. 1A illustrates a stack of layers used in, for example, TCP/IP data transfer. At its lowest level, the stack includes a physical layer 110. The physical layer 110 contains functionality necessary to carry the stream of data bits from one system to another through a medium, e.g., electrically through a conductor, electromagnetically (wirelessly), or optically through a fiber, air or vacuum. At a data-link layer 120, the data bits are arranged into data frames for delivering to a receiving system. The data frames may include suitable headers and/or footers (e.g., source/destination addresses, error detection information, flow control instructions, etc.). The data arranged in the data frames are sent as bit streams through the physical layer 110.

A network layer 130 delivers data in the form of packets from a source to a destination. In general, the network layer 130 may use different data-link and physical layers to deliver packets from the source to the destination. The network layer 130 uses the network address of the packet, e.g., IP address, to deliver the packet to the receiving system. A transport layer 140 is tasked with process-to-process delivery. For example, a process may require multiple data packets to completely transfer an e-mail message with a suitable order of the packets, confirmation of the error-free status of the packets, etc. TCP is an example of a transport layer protocol that performs functions at the transport layer 140. The next level of abstraction above the transport layer 140 is an application layer 150 that specifies the shared protocols and interface methods used by the hosts in a communications network.

Figure 1B:
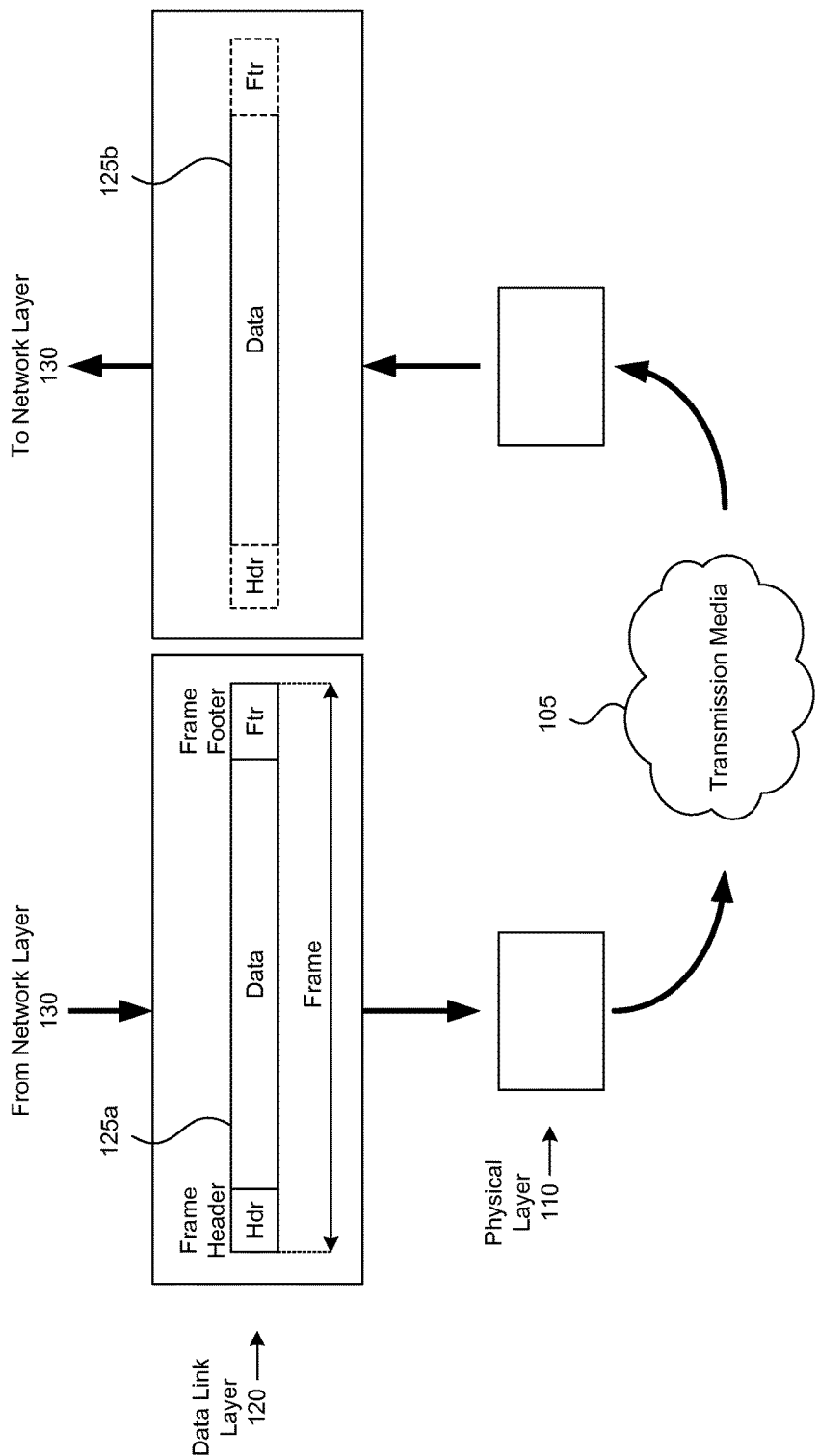
FIG. 1B is a schematic illustration of data transmission.

FIG. 1B is a schematic illustration of data transmission. As explained with reference to FIG. 1A, a data frame 125a can be formed at the data-link layer 120 to include data bits and frame header/footer. The data frame 125a may be transferred to the physical layer 110 where it is modulated and sent through a transmission medium 105 such as the atmosphere or optical fiber. This stream of data bits can be reformatted as a data frame 125b at a receiving data-link layer 120. In some instances, the header/footer data may be removed, and the frame 125b is next passed to the network layer for further routing.

Figure 2:
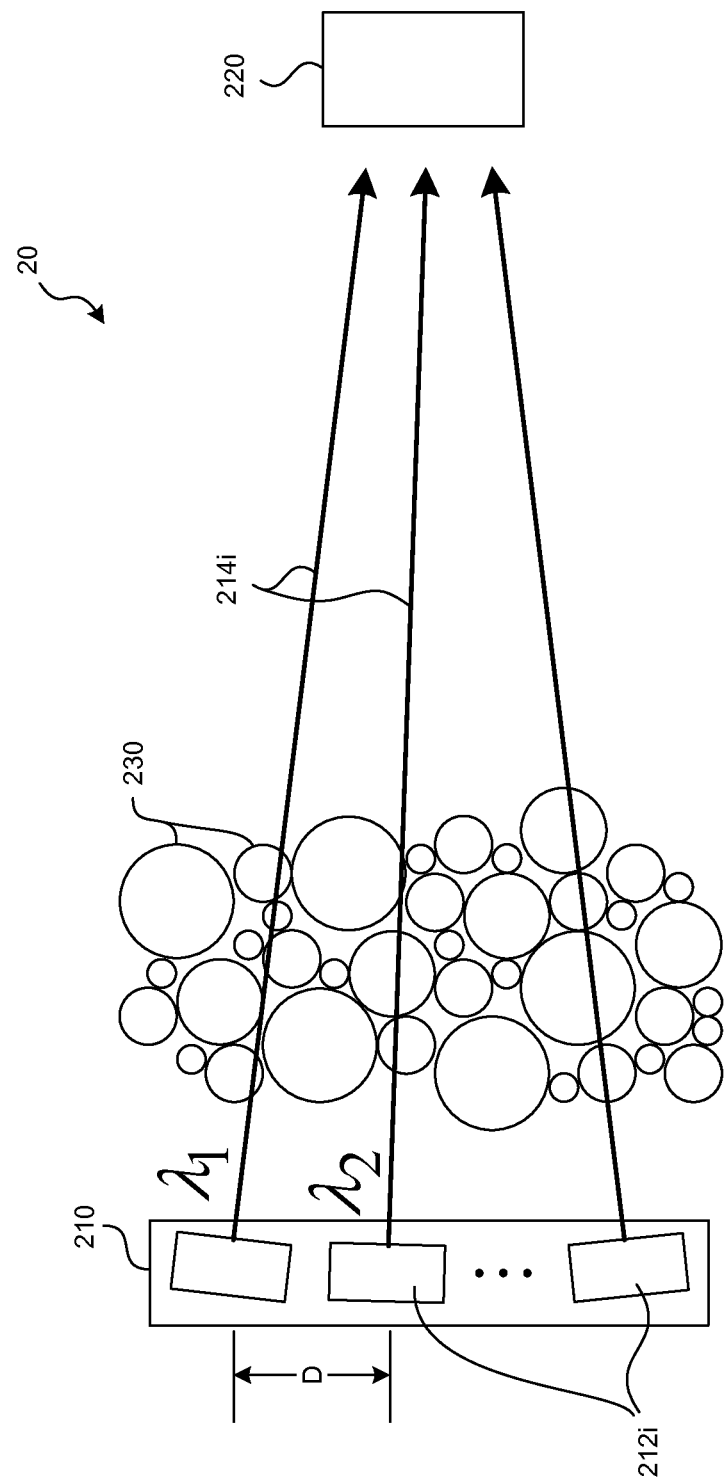
FIG. 2 is a simplified illustration of optical data transmission through the atmosphere in accordance with an embodiment of the present technology.

FIG. 2 is a simplified illustration of the optical data transmission through the atmosphere in accordance with an embodiment of the present technology. A multi-channel system 20 can have a TX 210 that includes multiple apertures 212$i$ for transmitting data streams that are encoded in laser beams 214$i$. The laser beams 214$i$ can operate at different wavelengths λ$i$. As illustrated in the example of FIG. 2, each beam 214$i$ may carry light at a single wavelength corresponding to a single data stream or channel. In other embodiments, each beam 214$i$ may carry light at multiple wavelengths corresponding to multiple data streams or channels. Although the specific example of laser beams is provided, it is contemplated that in some embodiments, optical sources other than lasers can be used including, for example, light emitting diodes. The separation between any two adjacent beams 214$i$ is denoted as D. In at least some embodiments of the inventive technology, the laser beams 214$i$ transmit independent data streams through the air or vacuum, therefore increasing throughput of the system 20. The laser beams 214$i$ are received by one or more RX's 220 that include receiving apertures and suitable optics to allow demodulators to coherently demodulate the modulated optical signal into a sequence of numerical values that estimate the transmitted symbol or a set of likelihood ratios for each possible symbol realization. In some embodiments, one of the TX 210 and RX 220 can reside at a ground station, while its RX/TX counterpart is airborne or spaceborne. In other embodiments, both the TX and RX can be ground-based or airborne/spaceborne. In at least some embodiments, turbulence 230 causes uneven densities of air along the path of the laser beam. These uneven densities of air in turn change the refractive index along the path of the individual laser beams 214$i$. Propagation through the variable refractive index along the beams' path results in different intensities of the laser beams 214$i$ arriving at the RX 220. Therefore, the data streams of the laser beams 214$i$ experience signal fading to differing degrees. In at least some embodiments, the separation between the beams D is large enough that the fading process is not correlated between beams 214$i$. Depending on sensitivity of the RX 220, signal intensity in some laser beams 214$i$ may fall below the sensitivity level of the RX, thus causing errors in the data stream. As explained above, moderate signal fading and/or other data errors in the channel may be corrected using the physical layer FEC code and channel interleaving. The physical layer FEC scheme can be based, for example, on low-density parity-check codes (LDPC), turbo product codes, or braided or concatenated algebraic codes such as BCH or Reed Solomon. However, in many practical applications the physical layer FEC code cannot correct for severe channel-fading-induced errors. In some embodiments of the inventive technology, when the physical layer error correction within the channel cannot fully recover the lost data frames, an additional error correction across the channels performed at the data-link layer 120 is used to avoid retransmission of the data frames. The error correction at the data-link layer is explained with reference to FIG. 3A below.

Figure 3A:
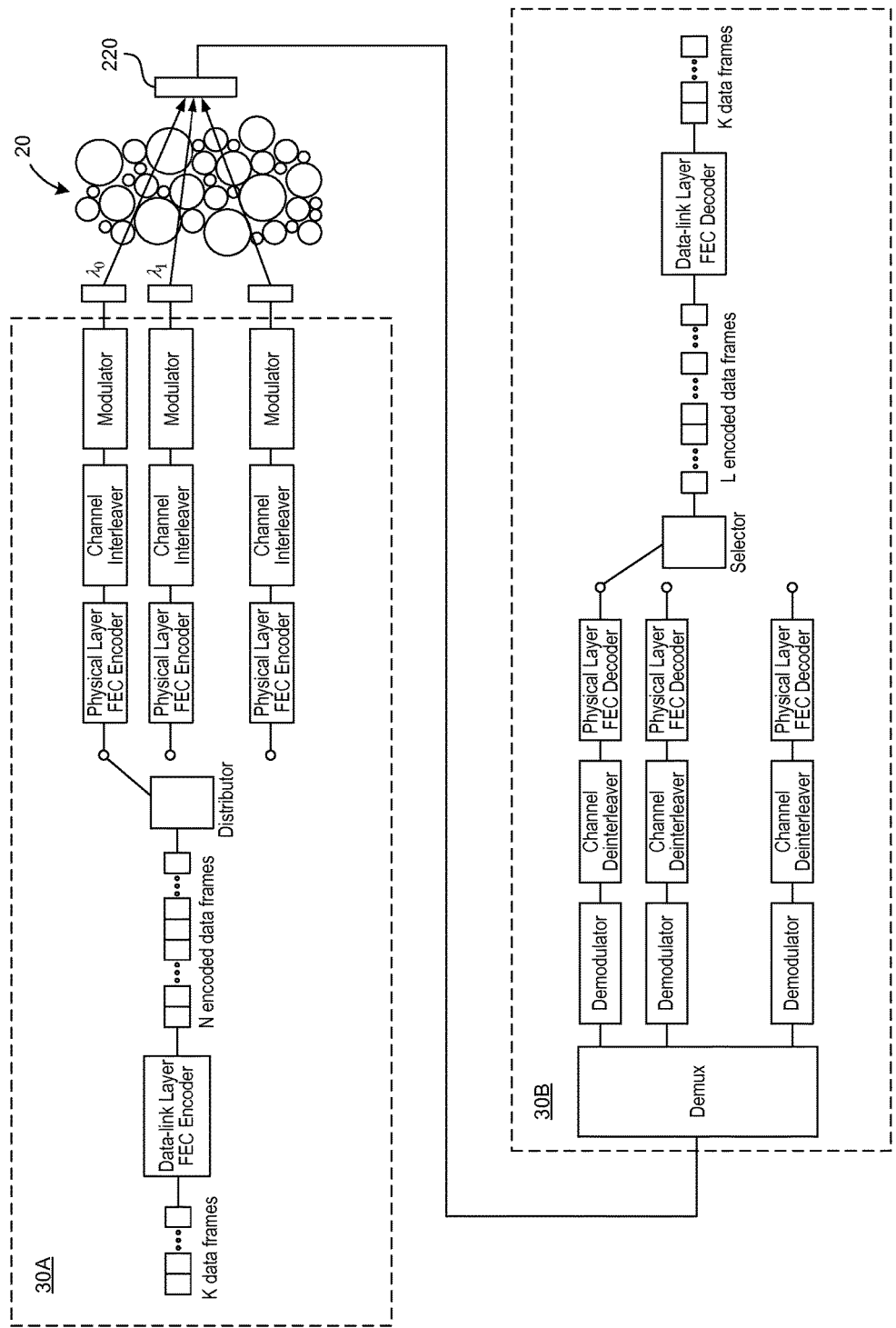
FIG. 3A is a schematic illustration of a system for data transmission between a TX and an RX in accordance with an embodiment of the present technology.

FIG. 3A is a schematic illustration of a system for data transmission between a TX 30A and an RX 30B in accordance with an embodiment of the present technology. In some embodiments, each of the TX 30A and/or RX 30B can be on the ground, airborne or spaceborne. Multiple laser beams of the multi-channel system 20 can transfer independent data streams between the TX 30A and RX 30B to increase the throughput of the data transmission.

Figure 3B:
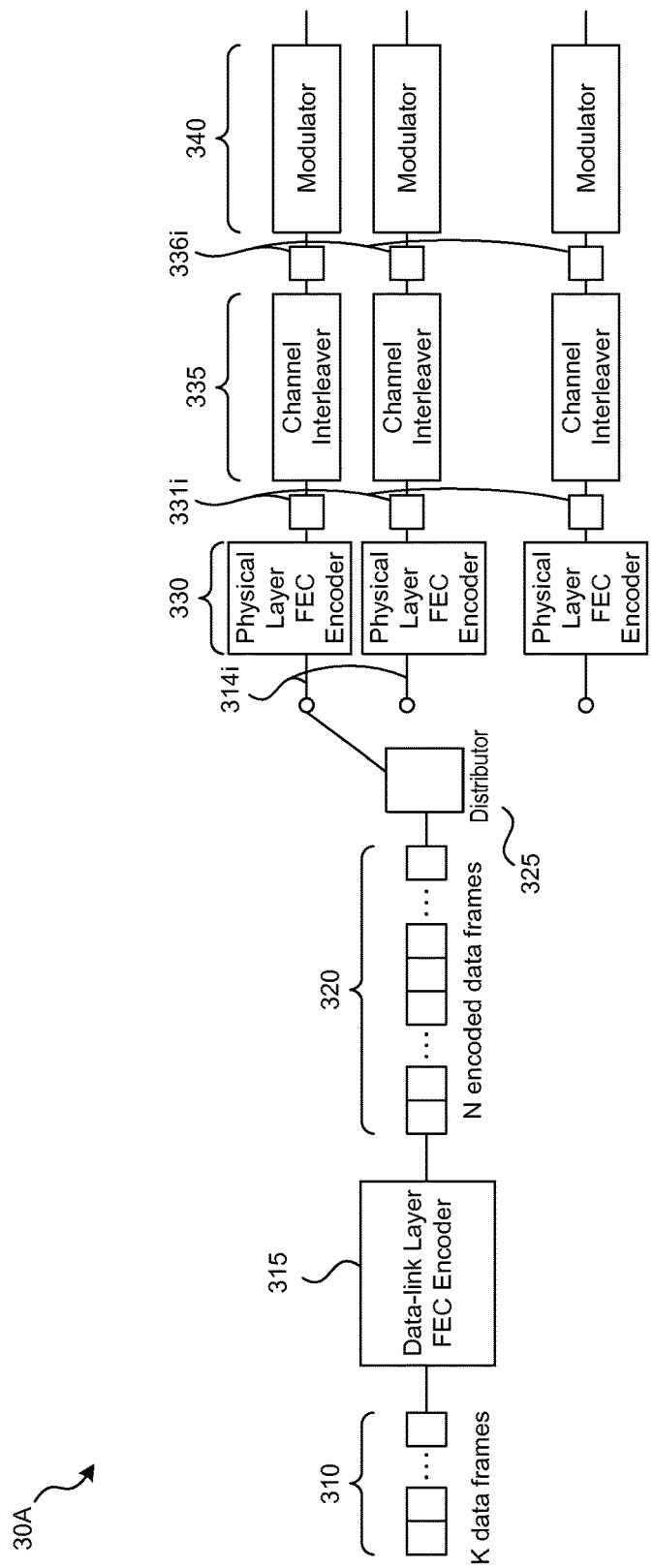
FIG. 3B is a schematic illustration of the TX of the system shown in FIG. 3A.
Figure 3C:
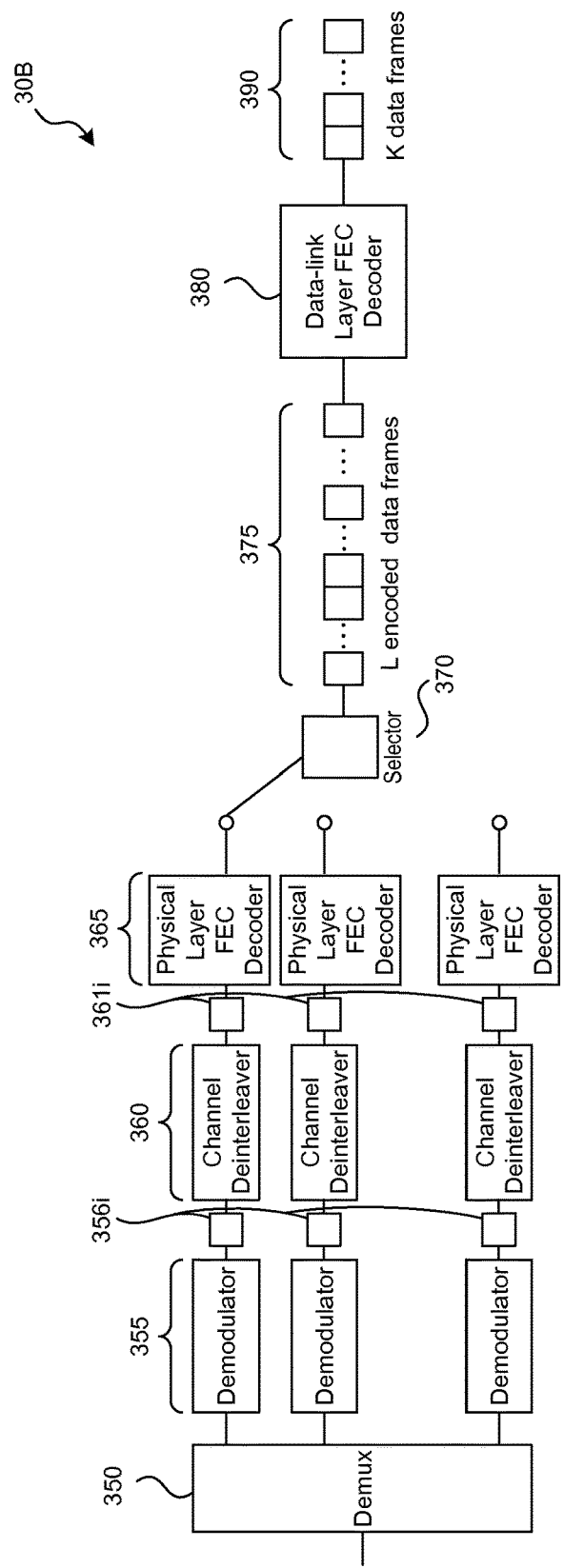
FIG. 3C is a schematic illustration of the RX of the system shown in FIG. 3A.

FIGS. 3B and 3C are schematic illustrations of the TX and the RX, respectively, of the system of FIG. 3A. FIG. 3B illustrates the TX 30A that processes K data frames 310. The incoming data frames 310 can be encoded using a data-link layer FEC encoder 315. For example, the data-link layer FEC code can be applied to a sequence of K data frames 310 to produce a sequence of N encoded data frames 320. In some embodiments of the inventive technology, the first K encoded data frames 320 can be identical to the original K data frames 310 to reduce average latency of the data transfer, while the subsequent N-K encoded data frames 320 are used as repair frames. A ratio R=K/N (sometimes called "rate of the code") can be used to measure a reduction of the throughput of data transfer in order to improve the reliability of data transfer. In some embodiments of the present technology, the data-link layer FEC encoder 315 is an erasure code encoder that uses fountain codes to generate N encoded data frames 320 from the K data frames 310. An example fountain code is a raptor code, for example the RaptorQ™ code that was adopted by Internet Engineering Task Force (IETF) as RFC 6330 standard. A fountain code may be used to provide flexibility in adjusting the ratio R=K/N. As explained below with reference to FIG. 3C, an RX can use the fountain code to decode the received encoded data frames and to recover the missing data frames that were not recoverable using physical layer FEC decoding. Therefore, the encoded data frames 320 can be used to recover the lost data frames at the data-link layer, thereby obviating the need to retransmit the lost data frames over the higher network layers having higher data latency.

In some embodiments, each of the N encoded data frames 320 are passed through a distributor 325 and are routed to one of multiple data channels 314$i$. In some embodiments of the inventive technology, the system 30A includes G data channels 314$i$ in parallel. A sequence of N encoded data frames 320 can be distributed across multiple independent data channels 314$i$, with a subset of the encoded data frames 320 being sent over each independent data channel 314$i$. In some embodiments, the distributor 325 distributes encoded data frames to data channels in a round-robin fashion. In some embodiments of the inventive technology, the encoded data frames 320 are further encoded using physical layer FEC encoders 330 in each data channel to encode the encoded frames 320 into codewords 331$i$. In each data channel, the physical layer FEC encoder 330 encodes additional error-correction bits to the encoded data frames 320, allowing for the correction of some channel errors at the receiver after the codewords are received in the corresponding data channel of the RX. After the physical layer FEC encoder 330, the symbols of the codewords 331$i$ can be interleaved by channel interleavers 335 into interleaved codewords 336$i$. In some embodiments, the interleaved codewords 336$i$ can be formed as described by International Telecommunication Union recommendation G.975.1. In some embodiments, for each data channel, a modulator 340 modulates the laser light of a designated wavelength according to symbols/bits of the interleaved codewords 336$i$. As explained above, the interleaved and modulated codewords can be transmitted from the TX 30A to the RX 30B through independent transmission medium channels (e.g., using multiple laser beams 214$i$ across air or space) in parallel to increase throughput of the data transmission. Each of the plurality of spatially separated beams 214$i$ may carry data from one or more of the data channels.

FIG. 3C is a schematic illustration of the RX 30B of the system shown in FIG. 3A. The interleaved and modulated codewords can be received through single or multiple apertures 350 and de-multiplexed into individual data channels that each correspond to a particular wavelength. Within each data channel, demodulator 355 can demodulate the received data into interleaved codewords 356$i$. In some embodiments, in each data channel, the deinterleaver 360 restores the sequence of symbols of the individual interleaved codewords 356$i$ to their pre-interleaved ordering in 361$i$. Next, physical layer FEC decoder 365 operates on the codewords 361$i$ of the data channel to correct the bit/symbol errors in the codewords 361$i$ of the particular data channel. This may occur in each of the G data channels in parallel. In this step, the encoded data frames are reconstituted from the physical layer FEC decoded symbols/information bits. If the number of errors in a particular codeword 361$i$ is below the threshold that the physical layer FEC decoder 365 is designed to correct, the original encoded frames 320 contained within or portions encompassed by the codeword are reconstructed and exported as encoded data frames 375. However, if the number of errors in a codeword 361$i$ exceeds the correction capability of the physical layer FEC decoder 365, that codeword is declared un-decodable and all encoded data frames contained within the codeword or that have portions encompassed by the codeword may have uncorrectable errors which upon detection will result in that encoded data frame being declared as erased. In general, depending on the number of the correction bits available to the physical layer FEC decoders 365, not all channel errors will be correctable, resulting in at least some lost encoded data frames.

To recover the erased encoded data frames that are un-decodable with the physical layer FEC decoders 365, an additional data frame recovery can be executed over multiple encoded data frames 375 using data-link layer FEC decoder 380, which, for example, may use erasure codes such as fountain codes. If successful, this data frame recovery at the data-link layer reconstructs the original data frames 310 without the generally undesirable requirement of retransmission of the data frames through higher layers (e.g., at the transport layer). In some embodiments, prior to being received by the data-link layer FEC decoder 380, the sequence of encoded data frames can be sent through a selector 370 as L encoded data frames. The selector 370 may operate at the frame rate of the receiver. In particular embodiments, the selector 370 may perform buffering and/or reordering of the encoded data frames 375 prior to sending them, one frame at a time, to the data-link layer FEC decoder 380. The data-link layer FEC decoder 380 produces output frames 390, which may or may not be the same as original data frames 310. The data-link layer FEC decoder 380 will succeed at recovering all of the original frames 310 (i.e., output frames 390 will be the same as original frames 310) provided that L is greater than or equal to K+O where O, called the overhead, is a property of the data-link layer FEC. The code parameters, N, K, O, and the size of the data frame are chosen to meet a desired performance level, typically a bit error or a packet loss rate, while trading off the throughput and latency. The probability Pr(H$_O$) of receiving less than K+O encoded frames is bounded by:

$$Pr(H_o) \leq \sum_{i=0}^{\left\lceil \frac{K+O}{M} \right\rceil} \binom{N/M}{i} \rho^{N/M-i}(1-\rho)^i$$

where M is a ratio between the channel coherence time (e.g., duration of time over which the channel impulse response may be considered as not varying) and data frame length, and p is the probability of channel outage. The data-link layer decoder failure probability can be used to evaluate code parameters for a given channel condition, and help select a code that balances data rate, reliability, and latency for a given set of requirements.

Figure 4:
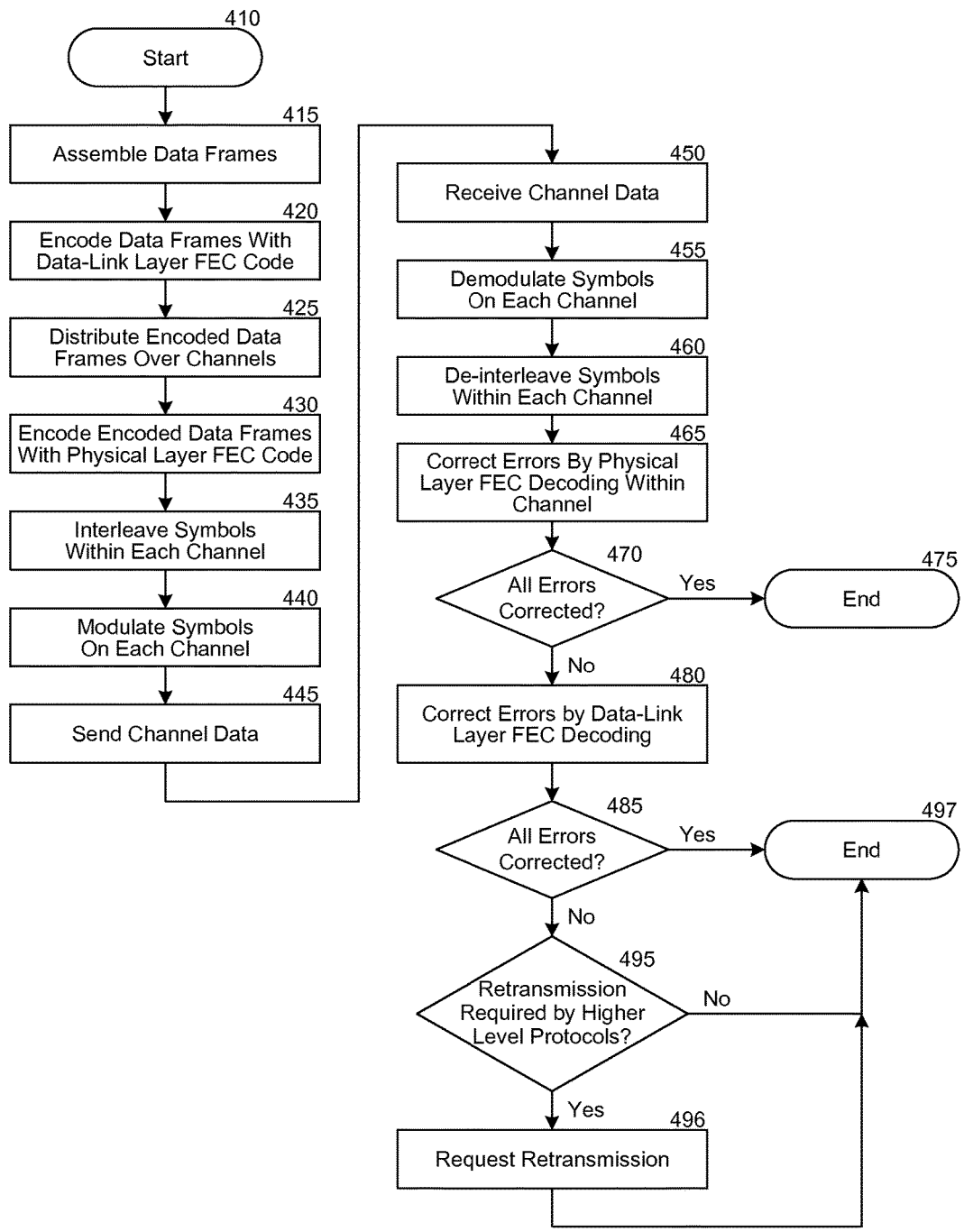
FIG. 4 is a flow diagram of a data correction method in accordance with an embodiment of the present technology.

FIG. 4 is a flow diagram of a data correction method in accordance with an embodiment of the present technology. In some embodiments of the present technology, the data correction method can be implemented using the systems described in FIGS. 3A-3C.

The illustrated data correction method starts at step 410. In step 415, the data frames are assembled. In some embodiments, the data frames may correspond to data frames shown in FIGS. 1B and 3B.

In step 420, the data frames 310 are encoded using a data-link layer FEC code to generate encoded data frames 320. In some embodiments, the data-link layer FEC code can be an erasure code, and in some embodiments, the erasure code can be a fountain code. As described in more detail below, the erasure code can be used for data-link layer error correction at the RX.

In step 425, the encoded data frames 320 are distributed to individual data channels using, for example, distributor 325. As mentioned above, distributor 325 may, for example, distribute encoded data frames 320 to individual data channels in a round-robin fashion until all encoded data frames have been distributed. The distributor 325 may operate at the frame rate of the transmitter.

Once within the individual data channels, the encoded data frames can be further encoded in step 430 into codewords 331$i$ using, for example, physical layer FEC codes. The symbols of the codewords can be interleaved in step 435 and modulated in step 440.

In step 445, the modulated interleaved codewords are sent through air and/or space to the RX over a plurality of spatially separated beams. In this example, each data channel has a distinct spectrum (e.g. center wavelength), and each data channel is sent through one beam.

In step 450, the light is received at the RX, which may have one or multiple apertures. In this example, the RX uses the demodulator 355 to demodulate the light in each data channel in step 455 and uses the data channel deinterleaver 360 to deinterleave the symbols at step 460.

In step 465, the received codewords are decoded to correct any bit errors. However, if the number of bit errors exceeds the number correctable by the physical layer FEC code, the error correction will be incomplete and the encoded data frames that are either completely or partially encompassed by that codeword may contain errors.

In step 470, the system verifies whether all errors in a particular encoded data frame are corrected. In the case of a systematic erasure code, if the errors are corrected on the first K data frames, the method ends in step 475. If all errors in the encoded data frame are still not corrected, in step 480 an additional error correction is performed at the data-link layer (e.g., using data frames transmitted through multiple channels). The error correction of step 480 can be based on the data-link layer FEC code (e.g., erasure code such as fountain code) applied in step 420. For example, the lost/corrupted data frame may be recovered by applying the data-link layer FEC over the L encoded data frames that were successfully transmitted by the TX and received by the RX. If this additional, data-link layer correction successfully recovers lost or corrupted data frames, then the retransmission of the lost/corrupted data frames is not necessary.

In step 485, the system verifies whether all lost/corrupted data frames have been recovered. If the data frames have been recovered, the method ends in step 497. However, if the data-link layer error correction did not recover the lost/corrupted data frames, then in step 495 the system verifies whether the higher layer protocols (e.g., TCP) require the retransmission of the affected data frame(s). For example, for voice over IP a high latency may make the retransmitted data useless, so the higher layer protocols may not request the retransmission. Conversely, for file transfer the retransmission can be useful, and the higher layer protocols may request it. If the retransmission is not required, the method ends in step 497. If retransmission is required, in step 496 retransmission is requested (e.g., by the RX), and the method ends in step 497.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A method, comprising:
encoding, by a computing device comprising at least one processor, one or more data frames with a data-link layer forward error correction (FEC) code to produce a plurality of encoded data frames, wherein parameters of the data-link layer FEC code are based on a failure probability of a data-link layer FEC decoder at a receiver (RX) and wherein the parameters and a size of the one or more data frames are selected to meet a performance level;

transmitting, by the computing device, the plurality of encoded data frames from a transmitter (TX) to the RX at least partially through air or space using a plurality of optical beams, wherein the plurality of encoded data frames is distributed using a round-robin distribution over the plurality of optical beams;
receiving, by the computing device, a plurality of encoded data frames at the RX;
identifying, by the computing device, at least one corrupted received encoded data frame and one or more non-corrupted received encoded data frames at the RX; and
reconstructing, by the computing device, the at least one corrupted received encoded data frame using the data-link layer FEC decoder, wherein the data-link layer FEC decoder operates over the non-corrupted received encoded data frames.

2. The method of claim 1, further comprising:
encoding the plurality of encoded data frames into codewords using a physical layer FEC encoder at the TX; and
decoding a received plurality of codewords into the plurality of encoded data frames received at the RX using a physical layer FEC decoder.

3. The method of claim 2, further comprising:
interleaving symbols of the codewords at the TX;
modulating interleaved codeword symbols at the TX;
demodulating received codeword symbols at the RX; and
deinterleaving received demodulated codeword symbols at the RX.

4. The method of claim 1 wherein the data-link layer FEC code is an erasure code.

5. The method of claim 4 wherein the erasure code is a fountain code.

6. The method of claim 5 wherein the fountain code is a raptor code.

7. The method of claim 1, wherein the plurality of encoded data frames are transmitted using intensity modulation techniques.

8. The method of claim 1 wherein the plurality of encoded data frames are transmitted using coherent modulation techniques.

9. The method of claim 1, further comprising:
declaring that reconstructing the at least one corrupted data frame was unsuccessful; and
requesting retransmission of the corrupted data frame.

10. The method of claim 1, further comprising a distributor configured to direct individual encoded data frames to individual channels at the TX.

11. The method of claim 1, further comprising a selector configured to receive encoded data frames from individual channels and provide them to the data-link layer FEC decoder at the RX.

12. The method of claim 1 wherein the plurality of optical beams have distinct spectra.

13. The method of claim 1 wherein the plurality of optical beams are not coincident at the TX.

14. A system, comprising:
a transmitter (TX) having a data-link layer forward error correction (FEC) encoder configured to encode one or more data frames to produce a plurality of encoded data frames using a data-link layer FEC code, wherein parameters of the data-link layer FEC code are based on a failure probability of a data-link layer FEC decoder at a receiver (RX) and wherein the parameters and a size of the one or more data frames are selected to meet a performance level;

a plurality of apertures configured to emit a plurality of optical beams at different wavelengths to transmit the plurality of encoded data frames at least partially through air, wherein the plurality of encoded data frames is distributed using a round-robin distribution over the plurality of optical beams; and the RX configured to:
receive the plurality of encoded data frames, wherein each different subset of the plurality of encoded data frames is received from each of the plurality of optical beams;
identify at least one corrupted received encoded data frame and one or more non-corrupted received encoded data frames; and
reconstruct the at least one corrupted received encoded data frame using a data-link layer FEC decoder, wherein the data-link layer FEC decoder operates over the non-corrupted received encoded data frames.

15. The system of claim 14, wherein the data-link layer FEC code is an erasure code.

16. The system of claim 14, wherein the TX is operable to transmit the plurality of encoded data frames using coherent modulation techniques.

17. The system of claim 14, wherein the TX is operable to transmit the plurality of encoded data frames using intensity modulation techniques.

18. A method, comprising:
encoding one or more data frames with a data-link layer forward error correction (FEC) code to produce a plurality of encoded data frames, wherein parameters of the data-link layer FEC code are based on a failure probability of a data-link layer FEC decoder;
transmitting the plurality of encoded data frames at least partially through air or space using a plurality of optical beams, wherein the plurality of encoded data frames is distributed using a round-robin distribution over the plurality of optical beams; and receiving a request for retransmission of a corrupted encoded data frame from the plurality of encoded data frames, wherein the request for retransmission is responsive to:
an identification of the corrupted encoded data frame and one or more non-corrupted encoded data frames from the plurality of encoded data frames; and
an unsuccessful reconstruction of the corrupted encoded data frame using the data-link layer FEC decoder, wherein the data-link layer FEC decoder operates over the non-corrupted encoded data frames.

19. The method of claim 18, wherein the data-link layer FEC code is an erasure code.

20. A method, comprising:
receiving a plurality of encoded data frames, wherein the plurality of encoded data frames were produced by encoding one or more data frames with a data-link layer forward error correction (FEC) code, and wherein the plurality of encoded data frames are received via one or more apertures for receiving a plurality of optical beams having designated wavelengths, wherein the plurality of encoded data frames distributed using a round-robin distribution over the plurality of optical beams is received from each of the plurality of optical beams, wherein parameters of the data-link layer FEC code are based on a failure probability of a data-link layer FEC decoder and wherein the parameters and a size of the one or more data frames are selected to meet a performance level;
identifying at least one corrupted received encoded data frame and one or more non-corrupted received encoded data frames; and
reconstructing the at least one corrupted received encoded data frame using the data-link layer FEC decoder, wherein the data-link layer FEC decoder operates over the non-corrupted received encoded data frames.

* * * * *